United States Patent
Schönberger

(10) Patent No.: US 10,761,502 B2
(45) Date of Patent: Sep. 1, 2020

(54) METHOD FOR OPERATING AN AUTOMATION COMPONENT

(71) Applicant: Siemens Aktiengesellschaft, München (DE)

(72) Inventor: Andreas Schönberger, Bamberg (DE)

(73) Assignee: SIEMENS AKTIENGESELLSCHAFT (DE)

(*) Notice: Subject to any disclaimer, the term of this patent is extended or adjusted under 35 U.S.C. 154(b) by 255 days.

(21) Appl. No.: 15/741,445

(22) PCT Filed: May 20, 2016

(86) PCT No.: PCT/EP2016/061394
§ 371 (c)(1),
(2) Date: Jan. 2, 2018

(87) PCT Pub. No.: WO2017/016699
PCT Pub. Date: Feb. 2, 2017

(65) Prior Publication Data
US 2018/0373214 A1   Dec. 27, 2018

(30) Foreign Application Priority Data
Jul. 24, 2015 (DE) .......... 10 2015 214 054

(51) Int. Cl.
G06F 11/00 (2006.01)
G05B 19/042 (2006.01)
(Continued)

(52) U.S. Cl.
CPC .......... *G05B 19/0426* (2013.01); *G06F 8/65* (2013.01); *G06F 8/656* (2018.02);
(Continued)

(58) Field of Classification Search
CPC ........ G06F 8/65; G06F 8/656; G06F 11/0706; G06F 11/0736; G06F 11/36; G06F 11/362; G06F 11/3668
See application file for complete search history.

(56) References Cited

U.S. PATENT DOCUMENTS

| | | | |
|---|---|---|---|
| 6,757,837 B1* | 6/2004 | Platt .................. | G06F 11/0748 714/38.13 |
| 2002/0095615 A1* | 7/2002 | Hastings ............ | G06F 11/0748 714/4.1 |

(Continued)

FOREIGN PATENT DOCUMENTS

| | | |
|---|---|---|
| CN | 102385522 A | 3/2012 |
| CN | 103377094 A | 10/2013 |

(Continued)

OTHER PUBLICATIONS

Bailer, Marius. English Translation of German Patent Application Publication No. DE102011107550. Jul. 11, 2011. http://translationportal.epo.org/emtp/translate/?ACTION=description-retrieval&COUNTRY=DE&ENGINE=google&FORMAT=docdb&KIND=A1&LOCALE=en_EP&NUMBER=102011107550&SRCLANG=de&TRGLANG=en. Accessed Nov. 27, 2019.*

(Continued)

*Primary Examiner* — Joshua P Lottich
(74) *Attorney, Agent, or Firm* — Schmeiser, Olsen & Watts LLP

(57) ABSTRACT

A method for operating an automation component by a control program having a plurality of control program components, the method including the steps: detecting error events of the control program during an operation of the automation component, downloading a current control program component for error analysis based on error events from a central system, and updating an existing control (Continued)

program component for error analysis by way of the current control program component for error analysis.

11 Claims, 1 Drawing Sheet

(51) Int. Cl.
*G06F 8/656* (2018.01)
*G06F 9/445* (2018.01)
*G06F 8/65* (2018.01)

(52) U.S. Cl.
CPC .......... *G06F 9/44521* (2013.01); *G06F 11/00* (2013.01); *G06F 11/008* (2013.01); *G05B 2219/23304* (2013.01); *G05B 2219/25064* (2013.01); *G05B 2219/31422* (2013.01)

(56) References Cited

U.S. PATENT DOCUMENTS

| | | | |
|---|---|---|---|
| 2003/0140275 A1* | 7/2003 | Imada | G05B 23/0291 714/24 |
| 2005/0085964 A1 | 4/2005 | Knapp | |
| 2005/0187649 A1 | 8/2005 | Funk et al. | |
| 2006/0168574 A1* | 7/2006 | Giannini | G06F 8/65 717/168 |
| 2007/0016340 A1 | 1/2007 | Soudier et al. | |
| 2008/0091815 A1* | 4/2008 | Rao | G06F 8/65 709/223 |
| 2009/0013208 A1* | 1/2009 | DiMuzio | G06F 9/4812 714/2 |
| 2011/0099597 A1* | 4/2011 | Boatright | H04L 41/5074 725/107 |
| 2012/0053901 A1 | 3/2012 | Arefeen | |
| 2012/0060151 A1 | 3/2012 | Oh et al. | |
| 2014/0142781 A1* | 5/2014 | Becker | G06F 21/74 701/1 |
| 2015/0089489 A1* | 3/2015 | Sarkar | H04L 67/12 717/173 |
| 2018/0004180 A1* | 1/2018 | Kar | G06F 8/65 |

FOREIGN PATENT DOCUMENTS

| | | |
|---|---|---|
| CN | 103617576 A | 3/2014 |
| DE | 10007971 A1 | 10/2000 |
| DE | 102010043011 A1 | 3/2012 |
| DE | 102011106078 A1 | 1/2013 |
| DE | 102011107550 A1 | 1/2013 |
| EP | 1300787 A1 | 4/2003 |

OTHER PUBLICATIONS

Non-English Chinese Office Action for Application No. 201680034340.9, dated Sep. 4, 2019.
International Search Report for PCT Application No. PCT/EP2016/061394, dated Aug. 22, 2016.

* cited by examiner

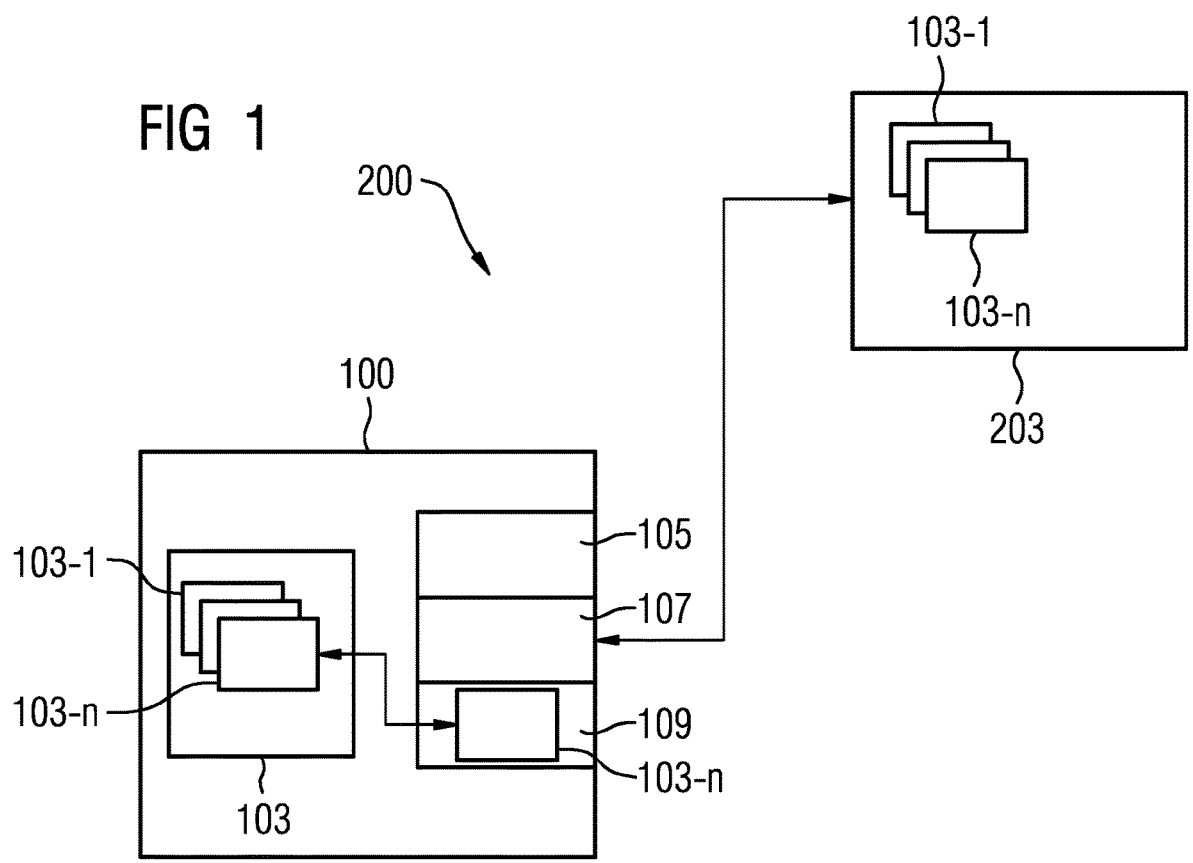
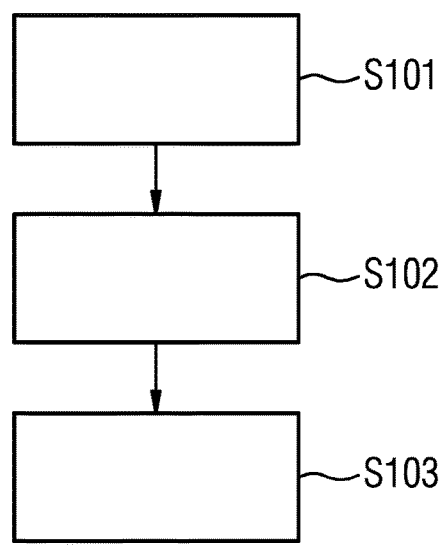

METHOD FOR OPERATING AN AUTOMATION COMPONENT

CROSS-REFERENCE TO RELATED APPLICATIONS

This application claims priority to PCT Application No. PCT/EP2016/061394, having a filing date of May 20, 2016, based off of German application No. DE 102015214054.7 having a filing date of Jul. 24, 2015, the entire contents of both of which are hereby incorporated by reference.

FIELD OF TECHNOLOGY

The following relates to a method for operating an automation component by a control program comprising a plurality of control program components and to an automation component.

BACKGROUND

Automation components such as field devices or programmable logic controllers (PLC) are integrated in complex automation systems in industrial installations of all types.

For this purpose, freely programmable parts of automation components are specifically programmed for these automation systems. On account of the complexity of the automation systems, particular fault events of the automation components occur only at the runtime and the response to many fault events is specifically defined for the respective automation system.

These points in turn collide with the common practice of programming the application logic for fault analysis and fault handling of automation components before the automation component is delivered since neither the future fault events nor the response to these fault events is/are known at the delivery time.

This results in the problem of only inadequate fault data being able to be gathered from the automation components on the basis of the fault events and of unsuitable fault handling procedures being initiated. Consequently, fault analysis must often be carried out by complicated semi-automated analysis. The fault handling of new fault events is only inadequately supported by the existing application logic on the automation components. This makes it necessary for the fault handling to have to be reinstalled in a complicated manner or else to be carried out manually.

The fault analysis and the fault handling are defined, on the one hand, at the product development time of automation components and, on the other hand, are supplemented by means of complicated manual and semi-automated methods.

SUMMARY

An aspect relates to improving the fault analysis and the fault handling of automation components.

According to a first aspect, this object is achieved by a method for operating an automation component by means of a control program comprising a plurality of control program components, having the steps of detecting fault events of the control program during operation of the automation component; downloading a current control program component for fault analysis from a central system on the basis of the detected fault events; and updating an existing control program component for fault analysis by means of the current control program component for fault analysis. The method likewise achieves the technical advantage, for example, that a lean control program can be installed when initially setting up the automation component, which control program is automatically supplemented with further control program components depending on the fault events which occur.

In one advantageous embodiment of the method, the method comprises the step of downloading a current control program component for fault handling from a database of the central system on the basis of the detected fault events. This likewise achieves the technical advantage, for example, that faults which occur cannot only be analyzed but can also be automatically eliminated.

In another advantageous embodiment of the method, the method comprises the step of updating an existing control program component for fault handling by the current control program component for fault handling. This likewise achieves the technical advantage, for example, that faults which occur cannot only be analyzed but can also be automatically eliminated.

In another advantageous embodiment of the method, the downloaded control program component is checked for harmful instructions. This achieves the technical advantage, for example, that the execution can be prevented if there is a defective control program component.

In another advantageous embodiment of the method, the current control program component is downloaded on the basis of a process image of the automation component. This achieves the technical advantage, for example, that, depending on the process image, it is possible to select a suitable control program component which matches the processes of the automation component.

In another advantageous embodiment of the method, the fault events of the automation component are transmitted to the central system. This achieves the technical advantage, for example, that information relating to fault events which occur is collected at a central location.

In another advantageous embodiment of the method, the fault events are mapped to respective control program components for fault analysis or fault handling in the central system. This achieves the technical advantage, for example, that a current control program component can always be kept available for all connected automation components.

In another advantageous embodiment of the method, the automation component transmits a device identifier or a device type to the central system. This achieves the technical advantage, for example, that a suitable control program component can be additionally selected on the basis of a device identifier.

In another advantageous embodiment of the method, the central system determines the control program component for fault analysis or fault handling on the basis of the transmitted device identifier or the transmitted device type. This likewise achieves the technical advantage, for example, that a suitable control program component can be additionally selected on the basis of a device identifier or device type.

According to a second aspect, this object is achieved by an automation component having a control program comprising a plurality of control program components, having a fault event detection unit for detecting fault events of the control program during operation of the automation component; a downloading unit for downloading a current control program component for fault analysis from a central system on the basis of the fault events; and an update unit for updating an existing control program component for fault analysis by the current control program component for fault analysis. The automation component likewise achieves the technical advantage, for example, that a lean control program can be installed when initially setting up the automation component, which control program is automatically supplemented with further control program components depending on the fault events which occur.

In one advantageous embodiment of the automation component, the automation component comprises an apparatus for checking the downloaded control program component for harmful instructions. This likewise achieves the technical advantage, for example, that the execution can be prevented if there is a defective control program component.

In another advantageous embodiment of the automation component, the automation component comprises a transmitting device for transmitting the fault events to the central system. This achieves the technical advantage, for example, that the fault events of the connected automation components can be centrally evaluated.

In another advantageous embodiment of the automation component, the automation component comprises a transmitting device for transmitting a device identifier or a device type to the central system. This likewise achieves the technical advantage, for example, that a suitable control program component can be additionally selected on the basis of a device identifier or a device type.

In one advantageous embodiment of the automation component, the update unit is designed to update an existing control program component for fault elimination by means of a current control program component for fault elimination. This achieves the technical advantage, for example, that the fault events cannot only be analyzed but can also be eliminated by means of current control program components.

According to a third aspect, this object is achieved by means of an automation system having a plurality of automation components according to the second aspect, having a central system which is connected to the automation components for detecting fault events and comprises a mapping table for mapping transmitted fault events to corresponding control program components for fault analysis or fault handling. The automation system achieves the same technical advantages as the method according to the first aspect or the automation component according to the second aspect.

BRIEF DESCRIPTION

Some of the embodiments will be described in detail, with reference to the following figures, wherein like designations denote like members, wherein:

In the drawings:

FIG. 1 shows a schematic view of an automation system; and

FIG. 2 shows a block diagram of the method.

DETAILED DESCRIPTION

FIG. 1 shows a schematic view of an automation system 200 having an automation component 100 and a central system 203. The automation component 100 is a part of an automation installation. In this automation installation, the individual automation components 100 cooperate in such a manner that the automation installation can achieve high performance in terms of precision, quantity and production speed.

The automation component 100 is, for example, a valve, a drive, a field device, an actuator, a sensor, a gripper or a control component for these apparatuses. The automation component 100 is freely programmable with a control program which is configured or programmed in a manner specific to the task. For this purpose, the automation component 100 comprises a processor for processing data and instructions of the control program 103 and a data memory, for example a RAM memory or a ROM memory, for storing data and instructions of the control program 103.

The automation component 100 comprises a fault event detection unit 105 for detecting fault events which occur during operation of the automation component 100. Fault events are, for example, fault messages relating to connection faults or control faults or else deviations from desired values or the reaching of limit values or threshold values. Generally, the fault events may cover all events which indicate the deviation of the automation component 100 or of the application-specific code of the automation component 100 from a normal state. The fault event is represented by a digital data record which comprises a corresponding item of information.

The detected fault events are transmitted to the central system 203 by a transmitting apparatus via the data line, for example in the form of data packets via the Internet.

The central system 203 is connected to the automation components 100 via a data line and receives the fault events from the automation component 100. The central system 203 comprises a data memory which stores a multiplicity of control program components 103-1, ..., 103-n, for example a database. The central system 203 uses a mapping table to map transmitted fault events to corresponding control program components 103-1, ..., 103-n. Depending on the transmitted fault event, the mapping table is searched for a suitable control program component 103-1, ..., 103-n for fault analysis or fault elimination which is assigned to the fault event.

In addition, control program components 103-n+1 can also be developed when previously completely unknown fault events occur or when optimizations for handling already known fault events become known. As a result, it is possible to use a standard method to distribute new fault analysis programs. This results in an ever larger quantity of fault analysis programs being available over time.

As soon as a suitable control program component 103-1, ..., 103-n has been found, the current control program component 103-1, ..., 103-n for fault analysis or fault elimination is downloaded to the automation component 100 by a downloading unit 107. An update unit 109 in the automation component 100 is used to set up or update an existing control program component 103-1, ..., 103-n for fault analysis or fault elimination by the current control program component 103-1, ..., 103-n. The updating comprises replacing or supplementing the existing control program component 103-1, ..., 103-n. For example, detailed data which are not gathered in a standard program can be gathered during fault analysis. In this case, the standard program for fault handling does not necessarily need to be replaced.

An apparatus for checking the downloaded control program component 103-1, ..., 103-n for harmful instructions may additionally be provided, for example a virus scanner.

A runtime environment on the automation component 100 makes it possible to execute the downloaded control program component 103-1, ..., 103-n. An interface makes it possible for the downloaded control program component 103-1, ..., 103-n to access fault events and process data of the automation component 100.

In order to obtain a compatible control program component 103-1, ..., 103-n from the central system 203, the automation component 100 has a transmitting device for transmitting a device identifier to the central system 203. The device identifier is, for example, a serial number or a device type of the automation component 100. The transmitted device identifier is then used by the central system 203 to identify a compatible control program component 103-1, . . . , 103-*n* from the multiplicity of control program components 103-1, . . . , 103-*n*. In addition, a process image can be transmitted to the central system 203. The process image is an image of the signal states, for example of the digital inputs and outputs in a CPU of the automation component 100 or the parameters and stages of a production process.

Therefore, the control program 103 written at the product definition time does not need to be manually modified in the automation system 200, but rather can be automatically supplemented via an individually downloadable control program component 103-1, . . . , 103-*n*. A specific control program component 103-1, . . . , 103-*n* for fault analysis and/or fault handling is downloaded on the basis of the fault message types defined at the development time and the fault events detected at the runtime and process images of the automation component 100.

As a result, it is possible to quickly and efficiently download additional control program components 103-1, . . . , 103-*n* for fault analysis and fault handling after the automation component 100 has been delivered. This makes it possible to reduce the effort for fault analysis or fault handling.

Furthermore, the correctness, completeness and repeatability of the data collection of fault events can be considerably improved. Knowledge of recurring problems on the basis of fault events which occur only after the automation component 100 has been delivered can be distributed over different projects and organizational units.

The central system 203 has a communication connection to the automation component 100 which is used in the automation system 200. This communication connection can be used to load the control program component 103-1, . . . , 103-*n* or other code from the central system 203 onto the automation component 100. The central system 203 also comprises mapping logic for mapping fault events and process values, which have been collected on automation components 100, to different control program components 103-1, . . . , 103-*n* for the purpose of fault analysis and fault handling. The control program component 103-1, . . . , 103-*n* identified in this manner is then offered for downloading. The central system 203 collects information relating to fault events and process values of automation components 100 in different automation systems 200 in order to adapt the mapping logic for mapping fault events and process values to corresponding control program components 103-1, . . . , 103-*n* by an additional analysis.

FIG. 2 shows a block diagram of the method. The method downloads control program components for fault analysis or fault handling on the basis of fault events and/or process images.

The method comprises the step S101 of detecting fault events of the control program 103 during operation of the automation component 100. In this case, it is detected whether the automation component 100 deviates from a normal state. The fault event is transmitted to the central system 203, for example in the form of a fault event ID. The central system 203 evaluates the fault event ID and searches for a corresponding control program component 103-1, . . . , 103-*n* for fault analysis or fault elimination and keeps it available for downloading.

In addition, it is possible to write or adapt the code for the fault analysis program in response to the fault events.

In step S102, the current control program component 103-1, . . . , 103-*n* is downloaded by the automation component 100 via a data line, for example the Internet.

As soon the current control program component 103-1, . . . , 103-*n* has been completely downloaded, it is set up on the automation component 100. For this purpose, an existing control program component 103-1, . . . , 103-*n* for fault analysis is updated by the current control program component 103-1, . . . , 103-*n* in step S103.

The method can be combined with a further method which not only collects data from automation components 100 in the event of a fault, but rather continuously collects data in order to predictively forecast the downloading of control program components. Generally, the method can also be used for components of other highly complex systems.

The knowledge of a fault analysis of the automation components 100 can be better distributed by the method. Fault events can be analyzed and eliminated more quickly since only a special control program component 103-1, . . . , 103-*n* is downloaded for fault elimination.

The correctness, completeness and repeatability of the data collection is improved and delivered control programs 103 are considerably streamlined since control program components 103-1, . . . , 103-*n* can be downloaded. Therefore, a smaller quantity of executable control program code can be provided during initial delivery. This may result, in particular, in automation components having to be equipped with less program memory and therefore in hardware of smaller dimensions being able to be offered at more favorable prices.

The response to faults which are not known at the time of producing the control program 103 or which cannot be predicted on account of a restricted view of the automation system 200 can also be defined after the automation component 100 has been used for the first time.

All features shown and explained in connection with individual embodiments of the invention can be provided in a different combination in the subject matter according to the invention in order to simultaneously achieve their advantageous effects. Features which have been described with respect to method steps can be implemented by means of corresponding objective features which are designed to carry out the respective method steps.

The scope of protection of embodiments of the present invention is given by the claims and is not restricted by the features explained in the description or shown in the figures.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating an automation component by a control program comprising a plurality of control program components, having the steps of:

detecting a fault event or fault events of the control program during operation of the automation component;

transmitting a device identifier or a device type to a central system;

selecting a control program component for fault analysis or fault handling based on the transmitted device identifier or the transmitted device type;

downloading the current control program component for fault analysis from the central system based on the identified fault event or the fault events; and updating an existing control program component for fault analysis by the current control program component for fault analysis.

2. The method as claimed in claim 1, also having the step of downloading a current control program component for fault handling from a database of the central system on the basis of the detected fault events.

3. The method as claimed in claim 2, also having the step of updating an existing control program component for fault handling by the current control program component for fault handling.

4. The method as claimed in claim 1, wherein the downloaded control program component is checked for harmful instructions.

5. The method as claimed in claim 1, wherein the current control program component is downloaded on the basis of a process image of the automation component.

6. The method as claimed in claim 1, wherein the fault events of the automation component are transmitted to the central system.

7. The method as claimed in claim 6, wherein the fault events being mapped to respective control program components for fault analysis or fault handling in the central system.

8. An automation component having a control program comprising a plurality of control program components, having:

a fault event detection unit for detecting a fault event or fault events of the control program during operation of the automation component, wherein the automation component includes a transmitting device for transmitting a device identifier or a device type to a central system based on the fault event or fault events detected;

a downloading unit for downloading a current control program component for the fault event or the fault events from the central system based on the fault or fault events detected; and an update unit for updating an existing control program component for fault analysis by the current control program component for fault analysis.

9. The automation component as claimed in claim 8, wherein the automation component comprising an apparatus for checking the downloaded control program component for harmful instructions.

10. The automation component as claimed in claim 8, wherein the update unit being designed to update an existing control program component for fault elimination by means of a current control program component for fault elimination.

11. An automation system having a plurality of automation components as claimed in claim 8, having:

the central system, wherein the central system is connected to the automation components for detecting fault events and comprises a mapping table for mapping transmitted fault events to corresponding control program components for fault analysis or fault handling.

* * * * *